(12) United States Patent
Chen et al.

(10) Patent No.: US 11,595,328 B2
(45) Date of Patent: Feb. 28, 2023

(54) METHODS, MEDIA AND COMPUTING DEVICES FOR IMPLEMENTING INSTANT MESSAGING SYSTEM BASED ON BLOCKCHAIN

(71) Applicant: NETEASE (HANGZHOU) NETWORK CO., LTD., Hangzhou (CN)

(72) Inventors: Gang Chen, Hangzhou (CN); Liang Ruan, Hangzhou (CN); Hangsheng Xu, Hangzhou (CN); Shanghu Luo, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 218 days.

(21) Appl. No.: 17/044,764

(22) PCT Filed: Nov. 23, 2018

(86) PCT No.: PCT/CN2018/117251
§ 371 (c)(1),
(2) Date: Oct. 1, 2020

(87) PCT Pub. No.: WO2019/200920
PCT Pub. Date: Oct. 24, 2019

(65) Prior Publication Data
US 2021/0112023 A1 Apr. 15, 2021

(30) Foreign Application Priority Data
Apr. 20, 2018 (CN) .......................... 201810364866.9

(51) Int. Cl.
*G06F 15/16* (2006.01)
*H04L 51/046* (2022.01)
*H04L 51/52* (2022.01)

(52) U.S. Cl.
CPC ............ *H04L 51/046* (2013.01); *H04L 51/52* (2022.05)

(58) Field of Classification Search
USPC ........................................................ 709/206
See application file for complete search history.

(56) References Cited

U.S. PATENT DOCUMENTS 10,122,661 B2 * 11/2018 Golan ................. G06F 16/2379
10,505,877 B2 * 12/2019 Golan ................. G06F 16/2379
(Continued)

FOREIGN PATENT DOCUMENTS

| CN | 101136877 A | 3/2008 |
| CN | 101188577 A | 5/2008 |

(Continued)

OTHER PUBLICATIONS

Office Action issued in corresponding CN Application No. 201810364866.9 with English translation dated Nov. 26, 2020 (33 pages).

(Continued)

*Primary Examiner* — Anthony Mejia
(74) *Attorney, Agent, or Firm* — Osha Bergman Watanabe & Burton LLP

(57) ABSTRACT

An instant messaging system based on blockchain includes: a central node and at least two domain instant messaging servers. The central node includes a management node and a blockchain node. Information about a user is stored in the blockchain node. The at least two domain instant messaging servers correspond to at least two instant messaging applications, respectively. A method for implementing the instant messaging system is implemented at the central node, and includes performing, in response to a request from the domain instant messaging server, a corresponding operation or providing corresponding information about a user to the (Continued)

domain instant messaging server. The central node establishes a communication connection with a plurality of domain instant messaging servers, such that each domain instant messaging server can send respectively data to the central node to realize a data sharing, and an interaction between different domain instant messaging servers.

18 Claims, 4 Drawing Sheets

(56) References Cited

U.S. PATENT DOCUMENTS

| | | | | |
|---|---|---|---|---|
| 2009/0186638 | A1* | 7/2009 | Yim | H04L 65/1104 709/206 |
| 2015/0379510 | A1* | 12/2015 | Smith | G06Q 20/3829 705/71 |
| 2017/0041259 | A1* | 2/2017 | Tao | H04L 51/04 |
| 2017/0048217 | A1* | 2/2017 | Biggs | H04L 63/0435 |
| 2017/0337382 | A1* | 11/2017 | Alonzo | G06F 21/6218 |
| 2017/0359288 | A1* | 12/2017 | Golan | H04L 67/1095 |
| 2018/0349990 | A1* | 12/2018 | Diriye | H04L 51/02 |
| 2019/0244306 | A1* | 8/2019 | Kursun | G06F 16/1837 |
| 2019/0260573 | A1* | 8/2019 | Goto | H04W 12/77 |
| 2019/0281465 | A1* | 9/2019 | Moshir | H04L 63/0428 |
| 2019/0311125 | A1* | 10/2019 | Mulgaonkar | G06F 9/4406 |
| 2019/0312831 | A1* | 10/2019 | Gupta | H04L 51/08 |
| 2019/0392530 | A1* | 12/2019 | Kursun | G06F 16/137 |
| 2020/0320211 | A1* | 10/2020 | Moore | H04L 63/10 |
| 2021/0103909 | A1* | 4/2021 | Widmann | G06F 16/2379 |
| 2021/0149899 | A1* | 5/2021 | Gutiérrez | G06F 9/451 |
| 2022/0076289 | A1* | 3/2022 | Williams Tubay | G06Q 20/387 |

FOREIGN PATENT DOCUMENTS

| | | |
|---|---|---|
| CN | 101677301 A | 3/2010 |
| CN | 101778053 A | 7/2010 |
| CN | 102209067 A | 10/2011 |
| CN | 103973545 A | 8/2014 |
| CN | 105577505 A | 5/2016 |
| CN | 106100981 A | 11/2016 |
| CN | 108306819 A | 7/2018 |
| WO | 2018031765 A1 | 2/2018 |

OTHER PUBLICATIONS

International Search Report issued in International Application No. PCT/CN2018/117251 dated Feb. 25, 2019 (2 pages).
Written Opinion issued in International Application No. PCT/CN2018/117251 dated Feb. 25, 2019 (4 pages).

* cited by examiner

METHODS, MEDIA AND COMPUTING DEVICES FOR IMPLEMENTING INSTANT MESSAGING SYSTEM BASED ON BLOCKCHAIN

TECHNICAL FIELD

Embodiments of the invention relate to the technical field of instant messaging. More particularly, embodiments of the invention relate to methods, media and computing devices for implementing an instant messaging system based on blockchain.

BACKGROUND OF THE INVENTION

This section is intended to provide a background or context to embodiments of the invention that are set forth in the claims. Though provided, no description in this section is an admission as prior art.

With the rapid development of science and technology, various instant messaging applications are increasingly employed in life and work. Generally, each instant messaging application is supported by a respective messaging server that provides services. For example, WeChat application is supported by a WeChat backend server that provides services, and QQ application is supported by a QQ backend server that provides services. However, users of different instant messaging applications are not able to communicate with each other. In order to interact with each other through instant messaging application, users have to download and use the same instant messaging application, which is extremely inconvenient, leading to a poor user experience.

SUMMARY OF THE INVENTION

An interaction between different instant messaging applications is not realized in prior art, therefore, communication efficiency between users is low, causing inconvenience to users.

A need therefore exists for an improved instant messaging system. The instant messaging system can comprise instant messaging servers corresponding to a plurality of instant messaging applications. An interaction between the instant messaging servers can be enabled, such that an instant communication between the plurality of instant messaging applications can be realized to improve user experience.

In the context, embodiments of the invention provide methods, media and computing devices for implementing an instant messaging system based on blockchain.

A first aspect of embodiments of the invention provides a method for implementing an instant messaging system based on blockchain. The instant messaging system can comprise a central node and at least two domain instant messaging servers. The central node can comprise a management node and a blockchain node. The blockchain node can store information about a user. The at least two domain instant messaging servers can correspond to at least two instant messaging applications, respectively. The method can be implemented at the central node. The method can comprise, in response to a request from the domain instant messaging server, performing a corresponding operation or providing the corresponding information about the user corresponding to the request to the domain instant messaging server.

In an embodiment of the invention, performing a corresponding operation in response to a request from the domain instant messaging server can comprise the management node, in response to receiving a registration request which is sent from a user through one of the domain instant messaging servers, performing a registration processing for the user and recording information about the user.

In an embodiment of the invention, recording information about the user can comprise the management node assigning a system unique identification to the user, establishing a mapping between the system unique identification and an initial identification for user's registration request, and recording information related to the system unique identification in the blockchain node.

In an embodiment of the invention, the information related to the system unique identification can comprise at least one of the system unique identification, a signature of the system unique identification, an address of the system unique identification and a characteristic value of the system unique identification upon establishment.

In an embodiment of the invention, the initial identification for the user's registration request can be a cell phone number.

In an embodiment of the invention, the method can further comprise the management node, in response to the user's request to change the initial identification for user's registration request with a new identification for registration, using the new identification for registration and updating the mapping.

In an embodiment of the invention, recording information about the user can comprise recording an identification of the domain instant messaging server at which the user's registration request is received.

In an embodiment of the invention, the method can further comprise the management node broadcasting to other domain instant messaging servers the identification of the domain instant messaging server at which the user's registration request is received.

In an embodiment of the invention, providing the corresponding information about the user to the domain instant messaging server in response to a request from the domain instant messaging server can comprise the blockchain node, in response to a request for acquiring a user's friend list which is received from one of the domain instant messaging servers, providing information related to the user's friend list to the domain instant messaging server.

In an embodiment of the invention, the information related to the user's friend list can comprise at least one of the user's friend list, a signature of the user's friend list, an address of the user's friend list, a characteristic value of the user's friend list upon establishment and an overall characteristic value of the user's friend list.

In an embodiment of the invention, the user's friend list can be generated by the user through another domain instant messaging server and sent to the blockchain node by said another domain instant messaging server. Alternatively, the user's friend list can be generated by the management node in response to a generating request and stored at the blockchain node, which generating request being initiated by the user through another domain instant messaging server.

In an embodiment of the invention, the method can further comprise the management node receiving a social media update posted by the user through one of the domain instant messaging servers and sending the social media update to other domain instant messaging servers.

In an embodiment of the invention, the method can further comprise the management node sending, in response to a user's login request to one of the domain instant messaging servers, a user login verification result to said one of the domain instant messaging servers.

In an embodiment of the invention, each one of domain instant messaging servers can comprise an instant messaging server or a server cluster that provides services for a corresponding instant messaging application.

In an embodiment of the invention, the method can further comprise recording an identification of the domain instant messaging server at which a user's login request is received.

In an embodiment of the invention, recording an identification of the domain instant messaging server at which a user's login request is received can comprise recording the identification of the domain instant messaging server that receives the user's current login request if the domain instant messaging server that receives the user's current login request differs from the domain instant messaging server which receives the user's last login request.

In an embodiment of the invention, the method can further comprise the management node broadcasting to other domain instant messaging servers the identification of the domain instant messaging server that receives the user's current login request.

In an embodiment of the invention, performing a corresponding operation in response to a request from the domain instant messaging server can comprise sending, in response to a request for sending information which is received from the domain instant messaging server, related information to a target domain instant messaging server. The target domain instant messaging server can comprise the domain instant messaging server with which a target user corresponding to the request for sending information registering or recently logging in.

A second aspect of embodiments of the invention provides a data processing method in an instant messaging system. The instant messaging system can comprise a central server and at least two domain instant messaging servers. The central server can store information about a user. The at least two domain instant messaging servers can correspond to at least two instant messaging applications, respectively. The method can be implemented at the central server. The method can comprise, in response to a request from the domain instant messaging server, performing a corresponding operation or providing the corresponding information about the user corresponding to the request to the domain instant messaging server.

In an embodiment of the invention, performing a corresponding operation in response to a request from the domain instant messaging server can comprise performing, in response to receiving a registration request which is sent from a user through one of the domain instant messaging servers, a registration processing for the user and recording information about the user.

In an embodiment of the invention, recording information about the user can comprise assigning a system unique identification to the user and establishing a mapping between the system unique identification and an initial identification for user's registration request.

In an embodiment of the invention, the method can further comprise storing information related to the system unique identification. The information related to the system unique identification can comprise at least one of the system unique identification, a signature of the system unique identification, an address of the system unique identification and a characteristic value of the system unique identification upon establishment.

In an embodiment of the invention, the initial identification for the user's registration request can be a cell phone number.

In an embodiment of the invention, the method can further comprise, in response to the user's request to change the initial identification for user's registration request with a new identification for registration, using the new identification for registration and updating the mapping.

In an embodiment of the invention, recording information about the user can comprise recording an identification of the domain instant messaging server at which the user's registration request is received.

In an embodiment of the invention, the method can further comprise broadcasting to other domain instant messaging servers the identification of the domain instant messaging server at which the user's registration request is received.

In an embodiment of the invention, providing the corresponding information about a user to the domain instant messaging server in response to a request from the domain instant messaging server can comprise, in response to a request for acquiring a user's friend list which is received from one of the domain instant messaging servers, providing information related to the user's friend list to the domain instant messaging server.

In an embodiment of the invention, the user's friend list can be generated by the user through another domain instant messaging server and sent to the central server by said another domain instant messaging server. Alternatively, the user's friend list can be generated by the management node in response to a generating request initiated by the user through another domain instant messaging server.

In an embodiment of the invention, the information related to the user's friend list can comprise at least one of the user's friend list, a signature of the user's friend list, an address of the user's friend list, a characteristic value of the user's friend list upon establishment and an overall characteristic value of the user's friend list.

In an embodiment of the invention, the method can further comprise receiving a social media update posted by the user through one of the domain instant messaging servers and sending the social media update to other domain instant messaging servers.

In an embodiment of the invention, performing a corresponding operation in response to a request from the domain instant messaging server can comprise sending, in response to a user's login request to one of the domain instant messaging servers, a user login verification result to said one of the domain instant messaging servers.

In an embodiment of the invention, the method can further comprise recording an identification of the domain instant messaging server at which a user's login request is received.

In an embodiment of the invention, recording an identification of the domain instant messaging server at which a user's login request is received can comprise recording the identification of the domain instant messaging server that receives the user's current login request if the domain instant messaging server that receives the user's current login request differs from the domain instant messaging server which receives the user's last login request.

In an embodiment of the invention, the method can further comprise broadcasting to other domain instant messaging servers the identification of the domain instant messaging server that receives the user's current login request.

In an embodiment of the invention, performing a corresponding operation in response to a request from the domain instant messaging server can comprise sending, in response to a request for sending information which is received from the domain instant messaging server, related information to a target domain instant messaging server. The target domain instant messaging server can comprise the domain instant messaging server with which a target user corresponding to the request for sending information registering or recently logging in.

In an embodiment of the invention, each one of domain instant messaging servers can comprise an instant messaging server or a server cluster that provides services for a corresponding instant messaging application.

In an embodiment of the invention, the central server can comprise a management node and a storage node.

In an embodiment of the invention, the management node can be configured to perform at least one of registering a user, assigning a system unique identification to the user, establishing a mapping between the system unique identification and an initial identification for user's registration request, and receiving a social media update posted by the user.

In an embodiment of the invention, the storage node can be configured to store at least one of the system unique identification of the user, a friend list of the user, and a record date of instant communication messages between users.

In an embodiment of the invention, the method can further comprise issuing incentive resource to users based on the recorded data of the instant communication messages between users.

In an embodiment of the invention, the storage node can be a blockchain node.

A third aspect of embodiments of the present invention provides a data processing method in an instant messaging system. The instant messaging system can comprise a central server and at least two domain instant messaging servers. The central server can store information about a user. The at least two domain instant messaging servers can correspond to at least two instant messaging applications, respectively. The method can be implemented at one of the at least two domain instant messaging servers. The method can comprise recording or updating the domain instant messaging server with which a user registering or recently logging in based on the identification of said one of the at least two domain instant messaging servers which receives the user's registration or the user's recent login request or the identification of another domain instant messaging server which is broadcast by the central server as receiving the user's registration or the user's recent login request.

In an embodiment of the invention, the method can comprise accepting a request for sending information from the user; and determining whether the domain instant messaging server with which a target user of the information registering or logging in is a current domain instant messaging server; if the domain instant messaging server with which the target user of the information registering or logging in is the current domain instant messaging server, sending the information to the target user by the current domain instant messaging server; and if the domain instant messaging server with which the target user of the information registering or logging in is another domain instant messaging server, sending the information to the central server which transmits the information to said another domain instant messaging server.

In an embodiment of the invention, the information can comprise one or more of general communication information, a social media update notification information, or a group information.

In an embodiment of the invention, if the information comprises the social media update notification information or the group information, a determination as to whether the domain instant messaging server with which the target user registering or recently logging in is the current domain instant messaging server can be made for each target user from among a plurality of target users of the information; if the domain instant messaging server with which the target user registering or recently logging in is the current domain instant messaging server, sending the information by the current domain instant messaging server; and if the domain instant messaging server with which the target user registering or recently logging in is another domain instant messaging server, sending the information to the central server which transmits the information to said another domain instant messaging server.

A fourth aspect of embodiments of the present invention provides a computing device. The computing device can comprise one or more memories configured to store executable instructions; and one or more processors configured to execute the executable instructions to implement any one of the methods discussed hereinabove.

A fifth aspect of embodiments of the present invention provides medium storing thereon executable instructions. When executed by a processor, the executable instructions can implement any one of the methods discussed hereinabove.

With the data processing method and data processing system in the instant messaging system provided in embodiments of the invention, the communication connections between the central server and the plurality of domain instant messaging servers enable the plurality of domain instant messaging servers to share the user related information through the central server, and an interaction between different domain instant messaging servers is realized through the central server.

BRIEF DESCRIPTION OF THE DRAWINGS

The above and other objects, features and advantages of exemplary embodiments of the invention will be readily understood by reading the following detailed description with reference to the accompanying drawings. Various embodiments of the invention are illustrated by way of example without limitation in the accompanying drawings of which.

In the drawings, same or corresponding reference numerals represent the same or corresponding elements.

DETAILED DESCRIPTION OF THE INVENTION

Figure 1:
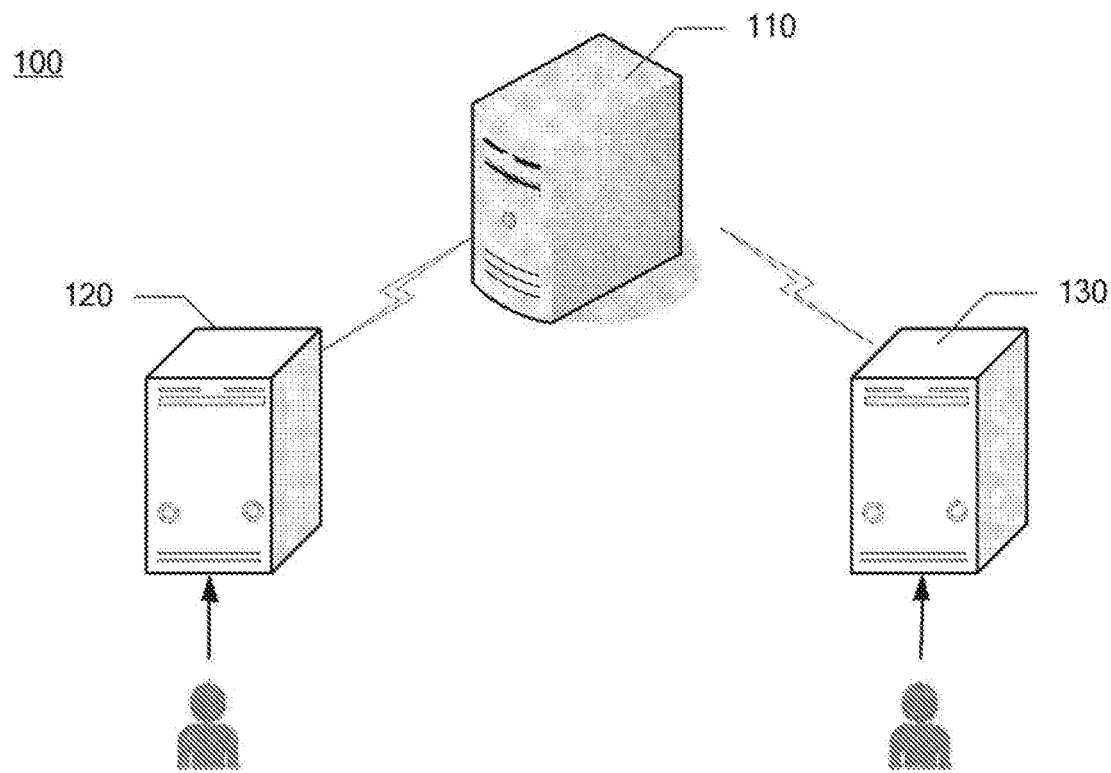
FIG. 1 schematically illustrates an application scenario according to an embodiment of the invention.

The principle and spirit of the invention will be described with reference to exemplary embodiments. It shall be understood that the embodiments are provided merely to enable those skilled in the art to better understand and implement the invention, without limiting the scope of the invention in any sense. Rather, the embodiments are provided such that the disclosure is thorough and complete, and the scope of the disclosure is completely conceivable by those skilled in the art.

It is apparent to those skilled in the art that, embodiments of the invention can be implemented as a system, an apparatus, a device, a method, or a computer program product. Therefore, the disclosure can be embodied as a pure hardware, a pure software (including firmware, resident software, microcode, etc.), or a combination of hardware and software.

Embodiments of the invention provide a method, a medium, and a computing device for processing data in an instant communication system.

It shall be understood that, throughout the disclosure, the number of an element illustrated in the drawings is merely exemplary rather than limiting, and a name of element is merely to distinguish the element from others without constructing any limitation.

The principle and spirit of the present invention will be described in detail with reference to representative embodiments of the invention.

Overview of Invention

The inventors have discovered that, an instant communication system can be provided to enable instant communication between different communication applications. The instant communication system can comprise a central server and a plurality of domain instant messaging servers. The central server can communicate with the plurality of domain instant messaging servers. Each domain instant messaging server can send respective and corresponding data to the central server, such that a data sharing and an interaction between different domain instant messaging servers can be realized through the central server.

Subsequent to the basic principles of the invention as discussed hereinabove, various non-limiting embodiments of the invention will be described below.

Overview of Application Scenarios

FIG. 1 schematically illustrates an application scenario according to an embodiment of the present invention.

As shown in FIG. 1, the application scenario can comprise an instant communication system 100. The instant communication system 100 can comprise a central server 110, a first domain instant messaging server 120 and a second domain instant messaging server 130.

In some embodiments of the disclosure, a communication connection can be established between the central server 110 and the first domain instant messaging server 120 and the second domain instant messaging server 130. The communication connection can include, for example, a wired communication link, a wireless communication link, and a fiber optic cable, etc.

In some embodiments of the disclosure, the first domain instant messaging server 120 and the second domain instant messaging server 130 can each be a server or a server cluster that provides services for a corresponding instant messaging application. For example, the first domain instant messaging server 120 and the second domain instant messaging server 130 can each be various backend servers or server clusters that provide support for an instant messaging application. For example, the first domain instant messaging server 120 can provide services for WeChat application, and the second domain instant messaging server 120 can provide services for QQ application.

In some embodiments of the disclosure, the central server 110 can be, for example, a gateway node, a routing node, a management platform, or other types of devices that store at least a portion of public information of a domain instant messaging server which is connected thereto.

In some embodiments of the disclosure, if the user A sends a message to the user B through the first instant messaging application, the first domain instant messaging server 120 can determine whether the user B registering with or recently logging in with the first domain instant messaging server 120. If the user B registering with or recently logging in with the first domain instant messaging server 120, then it can be determined that user A and user B belong to the same domain instant messaging server, and the first domain instant messaging server 120 can send the message to user B; otherwise, the first domain instant messaging server 120 can send the message to the central server 110, and the central server 110 can send the message to the corresponding domain instant messaging server with which the user B registering or recently logging in. Therefore, interaction between different communication applications can be realized to improve a communication efficiency between users of different communication applications and a user experience in using communication applications.

Exemplary Method

A data processing method in an instant messaging system according to an exemplary embodiment of the present invention will be described with reference to FIG. 2 to FIG. 4 in the application scenario of FIG. 1. It shall be noted that, the described application scenario is provided merely to better understand the spirit and principle of the invention, and embodiments of the invention are not limited thereto in any sense. Rather, embodiments of the invention can be implemented in any scenario where applicable.

Figure 2:
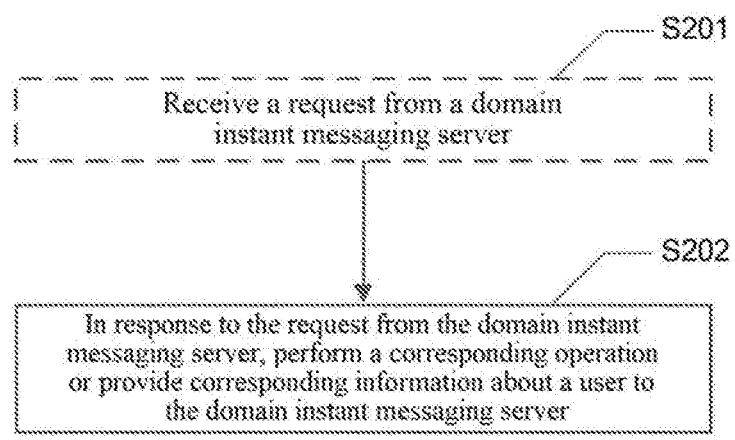
FIG. 2 schematically illustrates a flowchart of a data processing method of an instant messaging system based on blockchain according to an embodiment of the invention.

FIG. 2 schematically illustrates a flowchart of a method for implementing an instant messaging system based on blockchain according to an embodiment of the present invention.

In some embodiments of the disclosure, the instant messaging system can comprise a central node and at least two domain instant messaging servers. The central node can comprise a management node and a blockchain node, which blockchain node storing information about a user. The at least two domain instant messaging servers can be configured to correspond to at least two instant messaging applications, respectively.

In some embodiments of the disclosure, the central node can be configured to communicate with the at least two domain instant messaging servers.

In some embodiments of the disclosure, the domain instant messaging server can be a server or a server cluster that provides services for a corresponding instant messaging application. For instance, the domain instant messaging server can be various backend servers or server clusters that provide support for an instant messaging application. For example, a WeChat domain instant messaging server can provide services for WeChat application, and a QQ domain instant messaging server can provide services for QQ application.

In some instances, the method of FIG. 2 can comprise processes S201 to S202. The method can be implemented at the central node.

In process S201, a request from a domain instant messaging server can be received.

In process S202, in response to the request from the domain instant messaging server, a corresponding operation can be performed, or a corresponding information about a user can be provided to the domain instant messaging server.

In some embodiments of the disclosure, the central node can be in communication connection with the domain instant messaging server, thereby a data interaction is enabled. For instance, performing corresponding operation in response to the request from the domain instant messaging server can comprise the central node receiving the request from the domain instant messaging server and providing information related to the request to the domain instant messaging server. For instance, performing corresponding operation in response to the request from the domain instant messaging server can comprise the central node receiving the request from the domain instant messaging server and sending information related to the request to another domain instant messaging server. For instance, performing corresponding operation in response to the request from the domain instant messaging server can comprise the central node receiving on the request from the domain instant messaging server and performing relevant operations.

In some embodiments of the disclosure, performing a corresponding operation in response to a request from the domain instant messaging server can comprise the management node, in response to receiving a registration request which is sent from a user through one of the domain instant messaging servers, performing a registration processing for the user and recording the information about the user.

For instance, if a user registers with a domain instant messaging server A, the domain instant messaging server A can send the user's registration request to the management node. The management node can perform a corresponding registration process and record the information about the user in the blockchain node. Information related to registered users from different domain instant messaging servers can therefore be recorded and aggregated at the blockchain node. The respective domain instant messaging server can access the information about a user stored at the blockchain node to realize a cross-domain interaction.

In some embodiments of the disclosure, the management node can assign a system unique identification to the user, establish a mapping between the system unique identification and an initial identification for user's registration request, and record the information related to the system unique identification in the blockchain node. In some instances, the initial identification for user's registration request can be, for example, a cell phone number.

For instance, when a user registers with a domain instant messaging server, the management node can assign to each user a system identification which is unique in the entire instant messaging system to indicate the identity of the user in the instant messaging system, and establish a mapping between the system identification and the initial identification for user's registration request. For instance, a user can register with a cell phone number. The central server can assign to the user a system identification IFJij83aOPsl (for illustration only) and establish a mapping between the system identification and the user's cell phone number, thereby determining the user's unique identity in the system.

It can be understood that, a user can have different application identifications in different instant messaging applications. For example, the user's QQID for QQ application can be AAAAAA, and the user's WeChat ID for WeChat can be BBBBBB. The central server can also establish a mapping between the user's different application identifications in different instant messaging applications, the unique system identification, and the initial identification for user's registration request.

In some embodiments of the disclosure, the management node can record the information related to the system unique identification in the blockchain node. In some instances, the information related to the system unique identification can comprise at least one of the system unique identification, a signature of the system unique identification, an address of the system unique identification, and a characteristic value of the system unique identification upon establishment.

It can be understood that, in order to reduce a storage space occupied by the information related to the system unique identification, all the information related to the system unique identification may not necessarily be stored. In some instances, at least one of the signature of the system unique identification, the address of the system unique identification and the characteristic value of the system unique identification upon establishment can be selectively stored.

In some embodiments of the disclosure, the management node can be configured to, in response to the user's request to change the initial identification for user's registration request with a new identification for registration, use the new identification for registration and update the mapping.

For instance, a change in user's the cell phone number can be allowed in embodiments of the present disclosure. If the user changes his or her cell phone number, the user's system unique identification can remain unchanged. The initial cell phone number for user's registration request can be replaced with the new cell phone number, and the mapping between the cell phone number and the system unique identification can be updated.

In some instances, recording the information about the user can further comprise recording an identification of the domain instant messaging server at which the user's registration request is received. For instance, the user can register with a domain instant messaging server A, the domain instant messaging server A can send the user's registration request to the central node which records the information about the user. The information about the user can comprise the identification of the domain instant messaging server A with which the user registers, such that the central node can record the instant messaging application with which the user registers.

In some embodiments of the disclosure, the management node can be configured to broadcast to other domain instant messaging servers the identification of the domain instant messaging server at which the user's registration request is received. For instance, once receiving and recording a new user registration request, the management node can broadcast to other domain instant messaging servers the new user and the identification of the domain instant messaging server with which the new user is registered, such that each domain instant messaging server can update the information about the user.

In some embodiments of the disclosure, providing, in response to the request from the domain instant messaging server, corresponding the information about the user to the domain instant messaging server can comprise the blockchain node, in response to a request for acquiring a user's friend list which is received from one of the domain instant messaging servers, providing information related to the user's friend list to the domain instant messaging server.

In some embodiments of the disclosure, the blockchain node can be configured to store information related to friend list of each user. In some instances, the friend list can be generated by the user through another domain instant messaging server and sent to the blockchain node by said another domain instant messaging server. In some instances, the friend list can be generated by the management node in response to a generating request and stored at the blockchain node, which generating request being initiated by the user through another domain instant messaging server.

For instance, if the user logs in through the domain instant messaging server A, the domain instant messaging server A can send a request for acquiring the user's friend list to the blockchain node, and the blockchain node can accordingly provide the stored user's friend list to the domain instant messaging server A. Similarly, if the user logs in through the domain instant messaging server B, the user's friend list can also be obtained from the blockchain node. It can be understood that, the blockchain node in embodiments of the disclosure can be configured to store the information related to the friend list of each user, such that the user can obtain his or her friend list and interact with his or her friends regardless of which instant messaging application the user logs in.

In some embodiments of the disclosure, the information related to friend list of a user can comprise at least one of the user's friend list, a signature of the user's friend list, an address of the user's friend list, a characteristic value of the user's friend list upon establishment, and an overall characteristic value of the user's friend list.

It can be understood that, a storage space occupied by the information related to user's friend list can be large as it can include a friend avatar data. In order to reduce a storage space occupied by the information related to user's friend list, at least one of the signature of the user's friend list, the address of the user's friend list, the characteristic value of the user's friend list upon establishment, and the overall characteristic value of the user's friend list can be stored.

In some embodiments of the disclosure, the management node can be configured to receive a social media update posted by the user through one of the domain instant messaging servers and send the social media update to other domain instant messaging servers.

In some instances, the management node can be configured to actively send the social media update to other domain instant messaging servers. In some instance, the management node can be configured to send the social media update to other domain instant messaging servers in response to an update acquisition request received from the other domain instant messaging servers.

For instance, if a user X posts a social media update (e.g., WeChat moments, QQ space, etc.) through a domain instant messaging server A, the management node can receive the social media update and actively send the social media update to each domain instant messaging server to which the user X's friend in his or her friend list is connected. The management node can also send, in response to an update acquisition request received from a domain instant messaging server to which the user X's friend in his or her friend list is connected, the social media update to the domain instant messaging server that sends the update acquisition request.

In some embodiments of the disclosure, performing a corresponding operation in response to the request from the domain instant messaging server can comprise the management node sending, in response to a user's login request to one of the domain instant messaging servers, a user login verification result to said one of the domain instant messaging servers.

In some embodiments of the disclosure, when a user logs in a domain instant messaging server, the domain instant messaging server can send the user's login request to the management node. The management node can then verify the login request and send the verification result to the domain instant messaging server.

In some embodiments of the disclosure, once receiving the user's login request, the central node can record the identification of the domain instant messaging server at which the user's login request is received. Therefore, the login information of each user can be stored in the blockchain node, which login information including, for example, a time at which the user logs in, and with which domain instant messaging server the user logs in, etc.

In some instances, the management node can record the identification of the domain instant messaging server that receives the user's current login request if the domain instant messaging server that receives the user's current login request differs from the domain instant messaging server which receives the user's last login request.

In some embodiments of the disclosure, a determination can be made, at the domain instant messaging server with which the user currently logging in, as to whether the domain instant messaging server with which the user currently logging in differs from the domain instant messaging server with which the user last logging in. If there's a change in the domain instant messaging server, the user's current login request can be sent to the central node, such that the central node can record the user's login information.

In some embodiments of the disclosure, the domain instant messaging server with which the user currently logging in can directly send the user's current login request to the central node. A determination can be made, at the central node, as to whether the domain instant messaging server with which the user currently logging in differs from the domain instant messaging server with which the user last logging in. If there's a change in the domain instant messaging server, the central node can record the changed login information and broadcast the changed login information to other domain instant messaging servers.

With the method described hereinabove, the blockchain node of embodiments of the disclosure can record the domain the instant messaging server through which each user recently logging in the instant messaging system.

In some embodiments of the disclosure, the management node can be configured to broadcast to other domain instant messaging servers the identification of the domain instant messaging server that receives the user's login request. For instance, the management node can broadcast to other domain instant messaging servers once recording the user's login request, such that each domain instant messaging server can be synchronized with the login information of each user recorded in the blockchain node, and each domain instant messaging server can learn the domain instant messaging server through which each user last logging in to the instant messaging system.

In some embodiments of the disclosure, performing a corresponding operation in response to the request from the domain instant messaging server can comprise the management node, in response to a request for sending information which is received from a domain instant messaging server, sending related information to a target domain instant messaging server. In some instances, the target domain instant messaging server can comprise a domain messaging server with which a target user corresponding to the request for sending information registering or recently logging in.

In some embodiments of the disclosure, if a user X wishes to send information to a target user, a determination can be made as to whether the domain instant messaging server with which the target user registering or recently logging in is same as the domain instant messaging server to which the user X is currently connecting. The information can be sent by the domain instant messaging server if the domain instant messaging servers are the same. The information can be sent to the central node if the domain instant messaging servers are different. The information can then be sent from the central node to the domain instant messaging server with which a target user registering or recently logging in, and then from the domain instant messaging server with which a target user registering or recently logging in to the target user.

In some embodiments of the disclosure, a central node can be in a communicate connection with a plurality of domain instant messaging servers, and a blockchain node can be configured to store related information of each user. Therefore, information of each user can be shared among the plurality of domain instant messaging servers through the blockchain node, and an interaction between different domain instant messaging servers can be realized through the central node.

Figure 3:
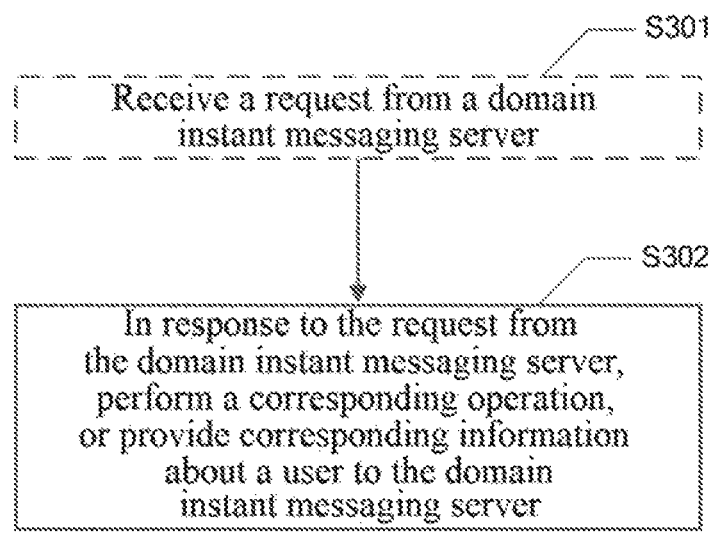
FIG. 3 schematically illustrates a flowchart of a data processing method in an instant communication system according to an embodiment of the invention.

FIG. 3 schematically illustrates a flowchart of a data processing method in an instant communication system according to an embodiment of the present invention.

In some embodiments of the disclosure, the instant communication system can comprise a central server and at least two domain instant messaging servers. The central server can be configured to store information about a user. The at least two domain instant messaging server can be configured to correspond to at least two instant messaging applications, respectively.

In some embodiments of the disclosure, the domain instant messaging server can be a server or a server cluster that provides services for a corresponding instant messaging application. For instance, the domain instant messaging server can be various backend servers or server clusters that provide support for an instant messaging application. For example, a WeChat domain instant messaging server can provide services for WeChat application, and a QQ domain instant messaging server can provide services for QQ application.

In some embodiments of the disclosure, the central server can be configured to communicate with the at least two domain instant messaging servers. For instance, the central server can be a network node such as a gateway or a route, which network node storing at least a portion of public information (for example, information about a user) of the at least two domain instant messaging servers which are connected to the central server.

In some instances, the method of FIG. 3 can comprise processes S301 to S302. The method can be implemented a central server.

In process S301, a request from a domain instant messaging server is received.

In process S302, in response to the request from the domain instant messaging server, a corresponding operation can be performed, or a corresponding information about a user can be provided to the domain instant messaging server.

In some embodiments of the disclosure, the central server can be in communication connection with the domain instant messaging server, thereby a data interaction is enabled. For instance, performing corresponding operation in response to the request from the domain instant messaging server can comprise the central server receiving the request from the domain instant messaging server and providing information related to the request to the domain instant messaging server. For instance, performing corresponding operation in response to the request from the domain instant messaging server can comprise the central service receiving the request from the domain instant messaging server and sending information related to the request to another domain instant messaging server. For instance, performing corresponding operation in response to the request from the domain instant messaging server can comprise the central service receiving, recording or processing the request from the domain instant messaging server.

In some embodiments of the disclosure, performing a corresponding operation in response to a request from the domain instant messaging server can comprise, in response to receiving a registration request which is sent from a user through one of the domain instant messaging servers, performing a registration processing for the user and recording the information about the user.

For instance, if a user registers with a domain instant messaging server A, the domain instant messaging server A can send the user's registration request to the central server. The central server can perform a corresponding registration process and record the information about the user. Information related to registered users from different domain instant messaging servers can therefore be recorded and aggregated at the central server. The respective domain instant messaging server can access public information stored at the central node to realize a cross-domain interaction.

In some instances, recording information about a user in the central server can comprise assigning a system unique identification to the user, establishing a mapping between the system unique identification and an initial identification for user's registration request. In some instances, the initial identification for user's registration request can be, for example, a cell phone number.

For instance, when a user registers, the central server can assign to each user a system identification which is unique in the entire instant messaging system to indicate the identity of the user in the instant messaging system, and establish a mapping between the system identification and the initial identification for user's registration request. For instance, a user can register with a cell phone number. The central server can assign to the user a system identification IFJij83aOPsl (for illustration only) and establish a mapping between the system identification and the user's cell phone number, thereby determining the user's unique identity in the system.

It can be understood that, a user can have different application identifications in different instant messaging applications. For example, the user's QQ ID for QQ application can be AAAAAA, and the user's WeChat ID for WeChat can be BBBBBB. The central server can also establish a mapping between the user's different application identifications in different instant messaging applications, the unique system identification, and the initial identification for user's registration request.

In some embodiments of the disclosure, recording information about a user can comprise recording information related to the system unique identification. In some instances, the information related to the system unique identification can comprise at least one of the system unique identification, a signature of the system unique identification, an address of the system unique identification, and a characteristic value of the system unique identification upon establishment.

It can be understood that, in order to reduce a storage space occupied by the information related to the system unique identification, all the information related to the system unique identification may not necessarily be stored. In some instances, at least one of the system unique identification, the signature of the system unique identification, the address of the system unique identification and the characteristic value of the system unique identification upon establishment can be selectively stored.

In some embodiments of the disclosure, the central server can be configured to, in response to the user's request to change the initial identification for user's registration request with a new identification for registration, use the new identification for registration and update the mapping.

For instance, a change in user's the cell phone number can be allowed in embodiments of the present disclosure. If the user changes his or her cell phone number, the user's system unique identification can remain unchanged. The initial cell phone number for user's registration request can be replaced with the new cell phone number, and the mapping between the cell phone number and the system unique identification can be updated.

In some instances, recording information about a user at the central server can further comprise recording the identification of the domain instant messaging server at which the user's registration request is received. For instance, the user can register with a domain instant messaging server A, the domain instant messaging server A can send the user's registration request to the central server which can record the information about the user. The information about the user can comprise the identification of the domain instant messaging server A with which the user registers, such that the central server can record the instant messaging application with which the user registers.

In some embodiments of the disclosure, the central server can be configured to broadcast to other domain instant messaging servers the identification of the domain instant messaging server with which the user registers. For instance, once receiving and recording a new user registration request, the central server can broadcast to other domain instant messaging servers the new user and the identification of the domain instant messaging server with which the new user is registered, such that each domain instant messaging server can share dynamic information of the system.

In some embodiments of the disclosure, providing, in response to the request from the domain instant messaging server, corresponding information about a user to the domain instant messaging server can comprise providing, in response to a request for acquiring user's friend list which is received from a domain instant messaging server, the user's friend list to the domain instant messaging servers.

In some embodiments of the disclosure, the central server can be configured to store information related to friend list of each user. In some instances, a friend relation in the friend list can be established by the user through another domain instant messaging server and sent to the central server by said another domain instant messaging server. In some instances, a friend relation in the friend list can be established by the management node in response to a generating request, which generating request being initiated by the user through another domain instant messaging server.

For instance, if the user logs in through the domain instant messaging server A, the domain instant messaging server A can send a request for acquiring the user's friend list to the central server, and the central server can accordingly provide the stored user's friend list to the domain instant messaging server A. Similarly, if the user logs in through the domain instant messaging server B, the user's friend list can also be obtained from the central server. It can be understood that, the central server in embodiments of the disclosure can be configured to store the friend list of each user, such that the user can obtain his or her friend list and interact with his or her friends regardless of which instant messaging application the user logs in.

In some embodiments of the disclosure, the information related to friend list of a user can comprise at least one of the user's friend list, a signature of the user's friend list, an address of the user's friend list, a characteristic value of the user's friend list upon establishment, and an overall characteristic value of the user's friend list.

It can be understood that, a storage space occupied by the information related to user's friend list can be large as it can include a friend avatar data. In order to reduce a storage space occupied by the information related to user's friend list, at least one of the signature of the user's friend list, the address of the user's friend list, the characteristic value of the user's friend list upon establishment, and the overall characteristic value of the user's friend list can be stored.

In some embodiments of the disclosure, the central server can be configured to receive a social media update posted by the user through one of the domain instant messaging servers and send the social media update to other domain instant messaging servers. In some instances, the management node can be configured to actively send the social media update to other domain instant messaging servers. In some instance, the management node can be configured to send the social media update to other domain instant messaging servers in response to an update acquisition request received from the other domain instant messaging servers.

For instance, if a user X posts a social media update (e.g., WeChat moments, QQ space, etc.) through a domain instant messaging server A, the central server can receive the social media update and actively send the social media update to each domain instant messaging server to which the user X's friend in his or her friend list is connected. The central server can also send, in response to an update acquisition request received from a domain instant messaging server to which the user X's friend in his or her friend list is connected, the social media update to the domain instant messaging server that sends the update acquisition request.

In some embodiments of the disclosure, performing a corresponding operation in response to the request from the domain instant messaging server can comprise sending, in response to a user's login request to one of the domain instant messaging servers, a user login verification result to said one of the domain instant messaging servers.

In some embodiments of the disclosure, when a user logs in a domain instant messaging server, the domain instant messaging server can send the user's login request to the central server. The central server can then verify the login request and send the verification result to the domain instant messaging server.

In some embodiments of the disclosure, once receiving the user's login request, the central server can record the identification of the domain instant messaging server at which the user's login request is received. Therefore, the login information of each user can be stored in the central server, which login information including, for example, a time at which the user logs in, and with which domain instant messaging server the user logs in, etc.

In some instances, the central server can record the identification of the domain instant messaging server that receives the user's current login request if the domain instant messaging server that receives the user's current login request differs from the domain instant messaging server which receives the user's last login request.

In some embodiments of the disclosure, a determination can be made, at the domain instant messaging server to which the user currently logging in, as to whether the domain instant messaging server to which the user currently logging in differs from the domain instant messaging server to which the user last logging in. If there's a change in the domain instant messaging server, the user's current login request can be sent to the central server, such that the central server can record the user's login information.

In some embodiments of the disclosure, the domain instant messaging server to which the user currently logging in can directly send the user's current login request to the central server. A determination can be made, at the central server, as to whether the domain instant messaging server to which the user currently logging in differs from the domain instant messaging server to which the user last logging in. If there's a change in the domain instant messaging server, the central server can record the changed login information and broadcast the changed login information to other domain instant messaging servers.

With the method described hereinabove, the central server of embodiments of the disclosure can record the domain the instant messaging server through which each user recently logging in the instant messaging system.

In some embodiments of the disclosure, the central server can be configured to broadcast to other domain instant messaging servers the identification of the domain instant messaging server that receives the user's login request. For instance, the central server can broadcast to other domain instant messaging servers once recording the user's login request, such that each domain instant messaging server can be synchronized with the login information of each user recorded in the central server, and each domain instant messaging server can learn the domain instant messaging server through which each user last logging in to the instant messaging system.

In some embodiments of the disclosure, performing a corresponding operation in response to the request from the domain instant messaging server can comprise sending, in response to a request for sending information which is received from a domain instant messaging server, related information to a target domain instant messaging server. In some instances, the target domain instant messaging server can comprise a domain messaging server corresponding to the request for sending information with which a target user registering or recently logging in.

In some embodiments of the disclosure, if a user X wishes to send information to a target user, a determination can be made as to whether the domain instant messaging server with which the target user registering or recently logging in is same as the domain instant messaging server to which the user X is currently connecting. The information can be sent by the domain instant messaging server if the domain instant messaging servers are the same. The information can be sent to the central server if the domain instant messaging servers are different. The information can then be sent from the central server to the domain instant messaging server with which a target user registering or recently logging in, and then from the domain instant messaging server with which a target user registering or recently logging in to the target user.

In some embodiments of the disclosure, the central server can comprise a management node and a storage node.

In some instances, the management node can be configured to perform at least one of registering a user, assigning the system unique identification to the user, establishing a mapping between the system unique identification and the initial identification for user's registration request, and receiving a social media update posted by the user.

The storage node can be configured to store at least one of the system unique identification of the user, a friend list of the user, and a record date of instant communication messages between users.

In some embodiments of the disclosure, the management node can issue incentive resource rewards to users based on the record date of the instant communication messages between users.

In some embodiments of the disclosure, the storage node can be a blockchain node.

In some embodiments of the disclosure, a central center can be in a communicate connection with a plurality of domain instant messaging servers and configured to store related information of each user. Therefore, information of each user can be shared among the plurality of domain instant messaging servers through the central server, and an interaction between different domain instant messaging servers can be realized through the central server.

Figure 4:
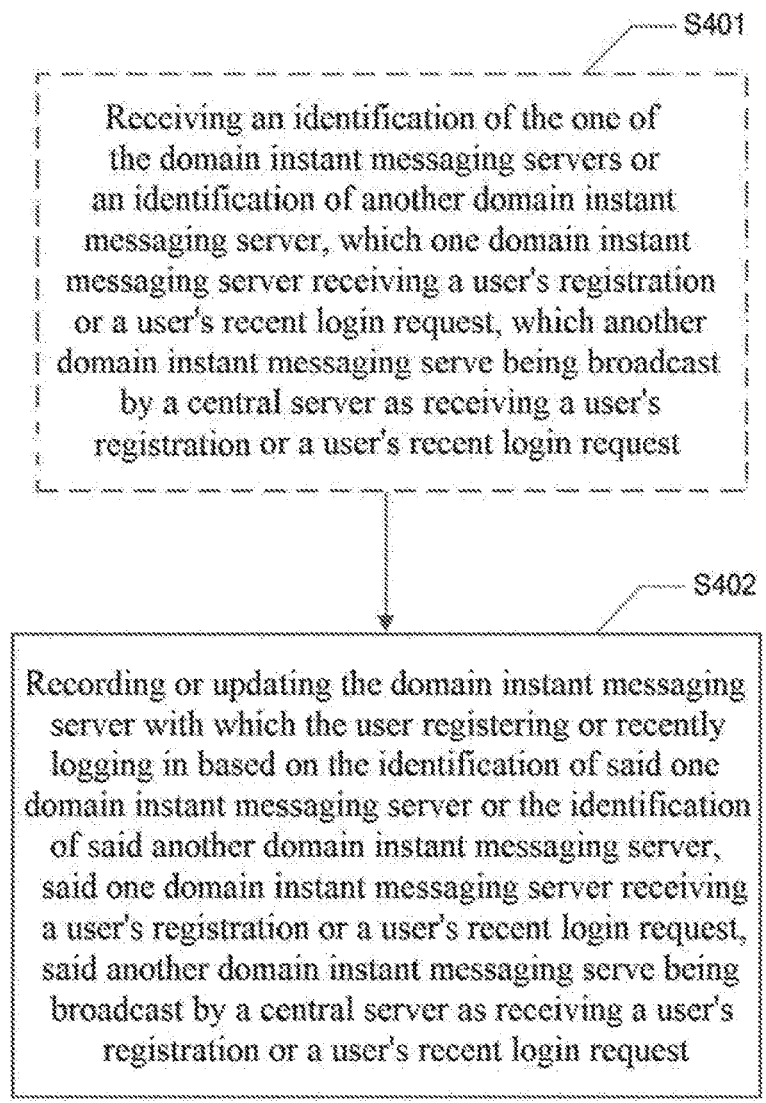
FIG. 4 schematically illustrates a flowchart of a data processing method in an instant communication system according to another embodiment of the invention.

FIG. 4 schematically illustrates a flowchart of a data processing method in an instant communication system according to another embodiment of the present invention.

In some embodiments of the disclosure, the instant communication system can comprise a central server and at least two domain instant messaging servers. The central server can be configured to store information about a user. The at least two domain instant messaging servers can be configured to correspond to at least two instant messaging applications, respectively.

In some instances, the method of FIG. 4 can comprise processes S401 to S402. The method can be implemented at one of the domain instant messaging servers.

In process S401, an identification of the one of the domain instant messaging servers or an identification of another domain instant messaging server can be received, which one domain instant messaging server receiving a user's registration or a user's recent login request, which another domain instant messaging server being broadcast by a central server as receiving a user's registration or a user's recent login request.

In process S402, the domain instant messaging server with which the user registering or recently logging in can be recorded or updated based on the identification of said one domain instant messaging server or the identification of said another domain instant messaging server, said one domain instant messaging server receiving a user's registration or a user's recent login request, said another domain instant messaging server being broadcast by a central server as receiving a user's registration or a user's recent login request.

It can be understood that, the central server and each domain instant messaging server can be configured to store the identification of the domain instant messaging server with which the user registering or recently logging in. For instance, the domain instant messaging server with which a user A registering is the domain instant messaging server 1, the domain instant messaging server to which the user A recently logging in is the domain instant messaging server 2, the domain instant messaging server with which a user B registering is the domain instant messaging server 3, the domain instant messaging server to which the user B recently logging in is the domain instant messaging server 1. Therefore, when the user sends a message, a determination as to whether the domain instant messaging server with which the target user registering or logging in is the local domain instant messaging server can be made based on the stored information, such that a determination can be made as to whether the message is to be sent by the local domain instant messaging server or the message is to be sent to the central server which transmits the message to another domain instant messaging server.

To update the information stored in each domain instant messaging server in accordance with an operation of a user, the domain instant messaging server, which receives the user's registration or the user's recent login request, can update the user information stored therein and in the meantime, send the user's registration or login request to the central server. The user's registration or login request can be broadcasted by the central server to other domain instant messaging servers, such that each of the other domain instant messaging servers can update or record the information about the user in a timely manner.

In some embodiments of the disclosure, if the domain instant messaging server with which the user registering or recently logging in is the current domain instant communication, the current domain instant messaging server can record the user and the identification of the domain instant messaging server with which the user registering (e.g., the current domain instant messaging server) once receiving the registration request from the user. The current domain instant messaging server can update the identification of the domain instant messaging server with which the user logging in (e.g., the current domain instant messaging server) once receiving the login request from the user.

For instance, if a user registers with a domain instant messaging server A, the domain instant messaging server A can record the user's registration. For instance, if a user logs in with a domain instant messaging server A, a login status of the user can be updated in the domain instant messaging server A as logging in with the domain instant messaging server A.

If the domain instant messaging server with which the user registering or recently logging in another domain instant messaging server, the current domain instant messaging server can update or record the user and the identification of the domain instant messaging server with which the user registering or logging in with user information broadcasted by the central server.

For instance, if a user registers with a domain instant messaging server B, the user's registration information (e.g., the registration information including registration with the domain instant messaging server B) can be broadcasted by the central server. The domain instant messaging server A can receive the broadcast and record therein the identification of the domain instant messaging server B with which the user registering. For instance, if a user logs in with the domain instant messaging server B, the identification of the domain instant messaging server B can be broadcasted by the central server. A login status of the user can be updated in the domain instant messaging server A as logging in with the domain instant messaging server B.

In some embodiments of the disclosure, once a request for sending information is accepted from a user, a determination can be made as to whether the domain instant messaging server with which the target user of the information registering or logging in is the current domain instant messaging server. If the domain instant messaging server with which the target user of the information registering or logging in is the current domain instant messaging server, then the information can be sent to the target user by the current domain instant messaging server. If the domain instant messaging server with which the target user of the information registering or logging in is another domain instant messaging server, then the information can be sent to the central server which transmits the information to said another domain instant messaging server. In some instances, the information can comprise one or more of general communication information, a social media update notification information, or a group information.

In some embodiments of the disclosure, if a user A wants to send information to a target user B, the user A can send a request to the current domain instant messaging server. The current domain instant messaging server can be configured to determine whether the domain instant messaging server with which the target user registering or recently logging in is the current domain instant messaging server. If the domain instant messaging server with which the target user registering or recently logging in is the current domain instant messaging server, the information can be sent by the current domain instant messaging server within the current domain; otherwise, the information can be sent to the central server by the current domain instant messaging server and transmitted to other domain instant messaging servers by the central server.

In some embodiments of the disclosure, if the information comprises a social media update notification information or a group information, a determination as to whether the domain instant messaging server with which the target user registering or recently logging in is the current domain instant messaging server can be made for each target user from among a plurality of target users of the information. If the domain instant messaging server with which the target user registering or recently logging in is the current domain instant messaging server, the information can be sent by the current domain instant messaging server. If the domain instant messaging server with which the target user registering or recently logging in is another domain instant messaging server, the information can be sent to the central server by the current domain instant messaging server and transmitted to said another domain instant messaging servers by the central server.

For instance, in case the target user includes a plurality of users, a determination as to whether the domain instant messaging server with which the target user registering or recently logging in is the current domain instant messaging server can be made for each target user from among the plurality of users. If the domain instant messaging server with which the target user registering or recently logging in is the current domain instant messaging server, the information can be sent by the current domain instant messaging server. If the domain instant messaging server with which the target user registering or recently logging in is another domain instant messaging server, the information can be sent to the central server which transmits the information to said another domain instant messaging server.

The domain instant messaging server in embodiments of the present disclosure can be configured to record or update the domain instant messaging server with which each user registering or recently logging in, such that a status information of each user can be obtained. Therefore, if information is to be sent to a target user, a determination can be made as to whether the target user is within the same communication application. If the target user is within the same communication application, an interaction between users can be realized by the domain instant messaging server of the communication application; otherwise, an interaction between users from different communication applications can be realized by the central server.

Embodiments disclosed hereinabove in the disclosure can be combined or modified to obtain a desired processing strategy and achieve improved technical effects.

Exemplary Medium

Exemplary embodiments of the invention provide a computer-readable storage medium that stores computer-executable instructions. When executed by a processing unit, the instructions can implement a data processing method in an instant messaging system or a method for implementing an instant messaging system based on blockchain according to any embodiment described hereinabove in the disclosure.

In some embodiments, aspects of the invention can be implemented as a program product which includes program code. When executed on a computing device, the program code can direct the computing device to execute the processes in a data processing method in an instant messaging system or processes in a method for implementing an instant messaging system based on blockchain according to any embodiment of the discourse described hereinabove in the "exemplary method" section. For instance, the computing device can be directed to perform the process S201 in FIG. 2 where a request from a domain instant messaging server being received, and process S202 where in response to the request from the domain instant messaging server, a corresponding operation being performed, or a corresponding information about a user being provided to the domain instant messaging server.

The program product can comprise any combination of one or more readable media. The readable medium can be a readable signal medium or a readable storage medium. The readable storage medium can be, for example, but not limited to, an electrical, magnetic, optical, electromagnetic, infrared or semiconductor system, apparatus or device, or any combination thereof. Examples (e.g., non-exhaustive list) of readable storage medium can comprise an electrical connection with one or more wires, a portable disk, a hard disk, random access memory (RAM), read-only memory (ROM), erasable programmable read-only memory (EPROM or flash memory), optical fiber, portable compact disc read-only memory (CD-ROM), optical storage device, magnetic storage device, or any combination thereof.

Figure 5:
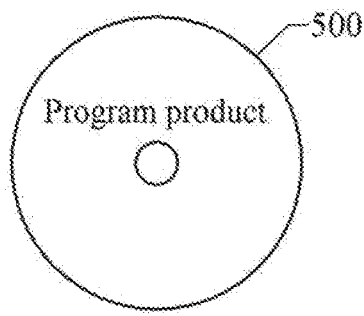
FIG. 5 schematically illustrates a schematic diagram of a readable storage medium according to an embodiment of the invention.

FIG. 5 illustrates a program product 500 for a data processing method in an instant messaging system or a method for implementing an instant messaging system based on blockchain according to embodiments of the disclosure. The program product can be provided as a portable compact disk read-only memory (CD-ROM) which includes program code. The program product can be executed on a computing device, such as a personal computer. However, the program product of the invention is not limited thereto. The readable storage medium of the disclosure can be any tangible medium containing or storing a program. The program can be used by or in combination with an instruction executing system, an apparatus or a device.

The readable signal medium can include a data signal that is in a baseband or propagated as a portion of a carrier wave, in which readable program code is carried. The propagated data signal can be provided with a plurality of forms, including but not limited to, electromagnetic signals, optical signals or any combination thereof. The readable signal medium can be any readable medium other than a readable storage medium, which readable medium can send, propagate or transmit a program that is used by or in combination with an instruction executing system, an apparatus or a device.

Program code on the readable medium can be transmitted using any appropriate medium, including but not limited to wireless, wire, optical fiber cable, RF, or any combination of above.

The program code for performing the processes of the invention can be coded in any combination of one or more programming languages. The programming language can include an object-oriented programming language such as Java or C++. The programming language can also include conventional procedural programming language such as C language or other similar programming languages. The program code can be executed entirely on a user computing device, partly on the user device, as an independent software package, partly on the user computing device and partly on a remote computing device, or entirely on the remote computing device or a server. In case a remote computing device is used, the remote computing device can be connected to the user computing device through any network including a local area network (LAN) or a wide area network (WAN). The remote computing device can alternatively be connected to an external computing device (e.g., connecting through an internet connection provided by an internet service provider).

Exemplary Computing Device

Figure 6:
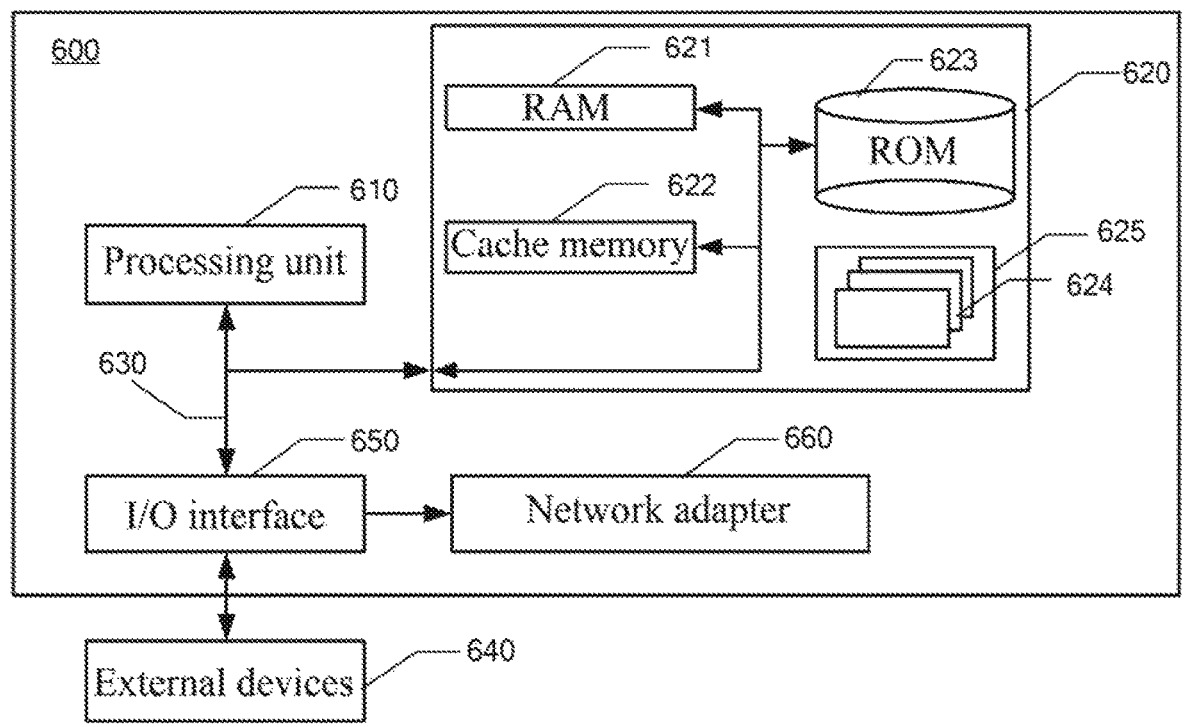
FIG. 6 schematically illustrates a computing device implementing a data processing method and a data processing system in an instant communication system according to an embodiment of the invention.

Subsequent to the methods, media and devices of exemplary embodiment of the present invention, FIG. 6 illustrates a computing device according to exemplary embodiments of the invention. The computing device can be configured to implement a data processing method in an instant messaging system or a method for implementing an instant messaging system of the invention.

Those skilled in the art can understand that, various aspects of the present invention can be implemented as a system, a method or a program product. Therefore, various aspects of the present invention can be embodied as a pure hardware, a pure software (including firmware, microcode, etc.), or a combination of hardware and software, which can be collectively referred to herein as circuit, module or system.

In some embodiments, a computing device of the invention can comprise at least one processing unit and at least one storage unit. In some instances, the storage unit stores program code. When executed by the processing unit, the program code can direct the processing unit to execute the processes in a data processing method in an instant messaging system according to any embodiment of the disclosure described hereinabove in the "exemplary method" section. For example, the processing unit can be directed to perform process S301 in FIG. 3 where a request from a domain instant messaging server being received, and process S302 where in response to the request from the domain instant messaging server, a corresponding operation being performed, or a corresponding information about a user being provided to the domain instant messaging server.

A computing device 600 according to embodiments of invention is described with reference to FIG. 6. The computing device 600 in FIG. 6 is merely an example which imposes no limitation on the function and scope of use of embodiments of the invention.

As shown in FIG. 6, the computing device 600 can be embodied as a general-purpose computing device. Components of the computing device 600 can comprise, but are not limited to, the at least one processing unit 610, the at least one storage unit 620, and a bus 630 connecting various system components (e.g., including the storage unit 620 and the processing unit 610).

The bus 630 can comprise one or more types of bus structures, including a memory bus or a memory controller, a peripheral bus, a graphics acceleration port, a processor, or a local area bus using any of a variety of bus structures.

The storage unit 620 can comprise a readable medium which is a volatile memory, such as a random access memory (RAM) 621 and/or a cache memory 622. The storage unit 620 can further comprise a read-only memory (ROM) 623.

The storage unit 620 can further comprise a program/utility tool 625 having a set (e.g., at least one) of program modules 624. The program modules 624 include, but are not limited to, an operating system, one or more application programs, other program modules, and program data. Each or a combination of these examples can include an implementation of a network environment.

The computing device 600 can communicate with one or more external devices 640 (e.g., keyboard, pointing device, Bluetooth device, etc.), communicate with one or more devices that enable users to interact with the computing device 600, and/or communicate with any device (e.g., router, modem, etc.) that enables the computing device 600 in communication with one or more other computing devices. Such communication can be performed through an input/output (I/O) interface 650. Furthermore, the computing device 600 can communicate with one or more networks (such as a local area network (LAN), a wide area network (WAN), and/or a public network such as the Internet) through a network adapter 660. As shown, the network adapter 660 can communicate with other modules of the computing device 600 through the bus 630. It should be understood that, though not shown in the drawings, other hardware and/or software modules can be used in combination with the computing device 600, which hardware and/or software modules including but not limited to microcode, a device driver, a redundant processing unit, an external disk drive array, a RAID system, a tape driver and a data backup storage system.

It should be noted that, although units/modules or sub-units/sub-modules of a device that displays multiple components in a display area are described hereinabove, this division is merely exemplary but not mandatory. In some embodiments of the invention, the features and functions of two or more units/modules described hereinabove can be embodied in one unit/module. Similarly, the features and functions of one unit/module described hereinabove can be further divided into and embodied in multiple units/modules.

Furthermore, although processes of method of the invention are described in a specific order in the drawings, it does not require or imply that the processes have to be performed in that specific order or that all of the processes have to be performed to achieve the desired result. Additionally or alternatively, certain processes can be omitted, multiple processes can be combined into process, and/or one process can be divided into multiple processes.

It should be understood that, while the spirit and principle of the invention have been described with reference to specific embodiments, the invention is not limited to the specific embodiments disclosed. A partition of various aspects of the invention does not prohibit a combination of features in these aspects to benefit, and such partition is merely provided for convenience of description. The invention shall also cover various modifications and equivalents that are within the spirit and scope of the appended claims.

The invention claimed is:

1. A method for implementing an instant messaging system based on blockchain, the instant messaging system comprising a management node and a blockchain node and at least two domain instant messaging servers, the blockchain node storing information about a user, the at least two domain instant messaging servers corresponding to at least two instant messaging applications, respectively, the method being implemented at the management node and the blockchain node and comprising:
   in response to a request from one of the at least two domain instant messaging servers, performing a corresponding operation or providing the information about the user corresponding to the request to any one of the at least two domain instant messaging servers;
   wherein performing the corresponding operation in response to the request from one of the domain instant messaging servers comprises the management node, in response to receiving a registration request which is sent from a user through one of the at least two domain instant messaging servers, performing a registration processing for the user and recording the information about the user; and
   wherein recording the information about the user comprises the management node assigning a system unique identification to the user, establishing a mapping between the system unique identification and an initial identification for user's registration request, and recording information related to the system unique identification in the blockchain node.

2. The method of claim 1, wherein the information related to the system unique identification comprises at least one of the system unique identification, a signature of the system unique identification, an address of the system unique identification, and a characteristic value of the system unique identification upon establishment.

3. The method of claim 1, further comprising:
   the management node, in response to the user's request to change the initial identification for user's registration request with a new identification for registration, using the new identification for registration and updating the mapping.

4. The method of claim 1, wherein recording the information about the user comprises:
   recording an identification of the domain instant messaging server at which the user's registration request is received.

5. The method of claim 4, further comprising:
   the management node broadcasting to other domain instant messaging servers the identification of the domain instant messaging server at which the user's registration request is received.

6. The method of claim 1, wherein providing the corresponding information about the user to the domain instant messaging server in response to a request from the domain instant messaging server comprises:
   the blockchain node, in response to a request for acquiring a user's friend list which is received from one of the domain instant messaging servers, providing information related to the user's friend list to the domain instant messaging server.

7. The method of claim 6, wherein the information related to the user's friend list comprises at least one of the user's friend list, a signature of the user's friend list, an address of the user's friend list, a characteristic value of the user's friend list upon establishment, and an overall characteristic value of the user's friend list.

8. The method of claim 6, wherein the user's friend list is generated by the user through another domain instant messaging server and sent to the blockchain node by said another domain instant messaging server, or the user's friend list is generated by the management node in response to a generating request and stored at the blockchain node, which generating request being initiated by the user through another domain instant messaging server.

9. The method of claim 8, further comprising:
the management node receiving a social media update posted by the user through one of the domain instant messaging servers and sending the social media update to other domain instant messaging servers.

10. The method of claim 1, further comprising:
the management node sending, in response to a user's login request to one of the domain instant messaging servers, a user login verification result to said one of the domain instant messaging servers.

11. The method of claim 1, further comprising:
recording an identification of the domain instant messaging server at which a user's login request is received.

12. The method of claim 11, wherein recording an identification of the domain instant messaging server at which a user's login request is received comprises:
recording the identification of the domain instant messaging server that receives the user's current login request if the domain instant messaging server that receives the user's current login request differs from the domain instant messaging server which receives the user's last login request.

13. The method of claim 11, further comprising:
the management node broadcasting to other domain instant messaging servers the identification of the domain instant messaging server that receives the user's current login request.

14. The method of claim 1, wherein performing a corresponding operation in response to a request from the domain instant messaging server comprises:
sending, in response to a request for sending information which is received from the domain instant messaging server, related information to a target domain instant messaging server, wherein the target domain instant messaging server comprises the domain instant messaging server with which a target user corresponding to the request for sending information registering or recently logging in.

15. A data processing method in an instant messaging system, the instant messaging system comprising a central server and at least two domain instant messaging servers, the central server storing information about a user, the at least two domain instant messaging servers corresponding to at least two instant messaging applications, respectively, the method being implemented at the central server and comprising:
in response to a request from one of the at least two domain instant messaging servers, performing a corresponding operation or providing the information about a user corresponding to the request to any one of the at least two domain instant messaging servers;
performing a corresponding operation in response to a request from one of the at least two domain instant messaging servers comprises performing, in response to receiving a registration request which is sent from a user through one of the at least two domain instant messaging servers, a registration processing for the user and recording the information about the user;
wherein recording the information about the user comprises assigning a system unique identification to the user and establishing a mapping between the system unique identification and an initial identification for user's registration request; and
the central server comprises a management node and a storage node.

16. A data processing method in an instant messaging system, the instant messaging system comprising a central server and at least two domain instant messaging servers, the central server storing information about a user, the at least two domain instant messaging servers corresponding to at least two instant messaging applications, respectively, the method being implemented at one of the at least two domain instant messaging servers and comprising:
recording or updating one of the at least two domain instant messaging servers with which a user registering or recently logging in based on the identification of said one of the at least two domain instant messaging servers which receives the user's registration or the user's recent login request or the identification of another of the at least two domain instant messaging servers which is broadcast by the central server as receiving the user's registration or the user's recent login request;
for one of the at least two domain instant messaging servers which is a current domain instant messaging server, accepting a request for sending information from the user, and
determining whether the current domain instant messaging server is a domain instant messaging server with which a target user of the information registering or logging in; if the current domain instant messaging server is the domain instant messaging server with which the target user of the information registering or logging in, sending the information to the target user by the current domain instant messaging server; and if the current domain instant messaging server is not the domain instant messaging server with which the target user of the information registering or logging in, sending the information to the central server which transmits the information to the domain instant messaging server with which the target user of the information registering or logging in.

17. A computing device, comprising:
one or more memories configured to store executable instructions; and
one or more processors configured to execute the executable instructions to implement the method of claim 1.

18. A non-transitory medium storing thereon executable instructions, when executed by a processor, the executable instructions implement the method of claim 1.

* * * * *